(12) United States Patent
Tonogai

(10) Patent No.: US 10,940,591 B2
(45) Date of Patent: Mar. 9, 2021

(54) CALIBRATION METHOD, CALIBRATION SYSTEM, AND PROGRAM

(71) Applicant: OMRON Corporation, Kyoto (JP)

(72) Inventor: Norikazu Tonogai, Nara (JP)

(73) Assignee: OMRON Corporation, Kyoto-shi (JP)

( * ) Notice: Subject to any disclaimer, the term of this patent is extended or adjusted under 35 U.S.C. 154(b) by 292 days.

(21) Appl. No.: 16/038,554

(22) Filed: Jul. 18, 2018

(65) Prior Publication Data

US 2019/0047152 A1 Feb. 14, 2019

(30) Foreign Application Priority Data

Aug. 9, 2017 (JP) .............................. JP2017-154016

(51) Int. Cl.
*B25J 9/16* (2006.01)

(52) U.S. Cl.
CPC ........... *B25J 9/1692* (2013.01); *B25J 9/1671* (2013.01); *B25J 9/1694* (2013.01); *B25J 9/1697* (2013.01)

(58) Field of Classification Search
CPC ...... B25J 9/1671; B25J 9/1692; B25J 9/1694; B25J 9/1697; G05B 2219/39008; G05B 2219/39024; G05B 2219/39045
See application file for complete search history.

(56) References Cited

U.S. PATENT DOCUMENTS

| | | | |
|---|---|---|---|
| 9,075,411 B2 * | 7/2015 | Aiso | ................. B25J 9/1692 |
| 9,193,073 B1 | 11/2015 | Huang et al. | |
| 10,399,227 B1 * | 9/2019 | Islam | ..................... G06T 7/80 |
| 2011/0280472 A1 * | 11/2011 | Wallack | ................... G06T 7/80 |
| | | | 382/153 |
| 2013/0328842 A1 * | 12/2013 | Barnhoefer | ............ G06F 3/044 |
| | | | 345/207 |
| 2015/0268748 A1 * | 9/2015 | Ge | ....................... G06F 1/1643 |
| | | | 345/173 |
| 2017/0221226 A1 * | 8/2017 | Shen | ........................ G06T 7/80 |
| 2018/0024521 A1 * | 1/2018 | Matsuura | .............. B25J 9/1692 |
| | | | 700/83 |
| 2018/0189565 A1 * | 7/2018 | Lukierski | ............... A47L 9/009 |

(Continued)

FOREIGN PATENT DOCUMENTS

JP 2015-182144 A 10/2015

OTHER PUBLICATIONS

The extended European search report dated Jan. 30, 2019 in a counterpart European patent application.

(Continued)

*Primary Examiner* — Robert T Nguyen
(74) *Attorney, Agent, or Firm* — Metrolex IP Law Group, PLLC

(57) ABSTRACT

This method is for calibrating a coordinate system of an image capture device and a coordinate system of a robot arm in a robot system that includes a display device, the image capture device, and the robot arm to which one of the display device and the image capture device is fixed, the robot arm having a drive shaft. The method includes: acquiring first captured image data based on first image data; acquiring second captured image data based on second image data different from the first image data; and calibrating the coordinate system of the image capture device and the coordinate system of the robot arm, using the first captured image data and the second captured image data.

20 Claims, 7 Drawing Sheets

(56) References Cited

U.S. PATENT DOCUMENTS

| | | | | |
|---|---|---|---|---|
| 2018/0194007 A1* | 7/2018 | Namiki | .................... | B25J 19/04 |
| 2018/0194008 A1* | 7/2018 | Namiki | .................... | G06T 7/80 |
| 2019/0030722 A1* | 1/2019 | Yamaguchi | ............ | B25J 9/1664 |
| 2019/0099887 A1* | 4/2019 | Huang | ................. | G01B 11/005 |
| 2019/0105780 A1* | 4/2019 | Cambron | ............... | B25J 9/1697 |
| 2019/0105781 A1* | 4/2019 | Harada | ................. | B25J 9/1692 |

OTHER PUBLICATIONS

Christoph Schmalz et al., "Camera Calibration: Active versus Passive Targets", Retrieved from the Internet: URL:http://citeseerx.ist.psu.edu/viewdoc/download?doi=10.1.1.440.5672&rep=rep1&type=pdf [retrieved on Jan. 13, 2017], Nov. 1, 2011, pp. 113601-113601, XP055542278, DOI: 10.1117/1.3643726, Relevance is indicated in the extended European search report dated Jan. 30, 2019.

Wikipedia, "Camera resectioning", Retrieved from the Internet: URL:https://web.archive.org/web/20170123073419/https://en.wikipedia.org/wiki/Camera_resectioning [retrieved on Jan. 16, 2019], Jan. 23, 2017, XP055542758, Relevance is indicated in the extended European search report dated Jan. 30, 2019.

* cited by examiner

US 10,940,591 B2

CALIBRATION METHOD, CALIBRATION SYSTEM, AND PROGRAM

CROSS-REFERENCES TO RELATED APPLICATIONS

This application claims priority to Japanese Patent Application No. 2017-154016 filed Aug. 9, 2017, the entire contents of which are incorporated herein by reference.

FIELD

The disclosure relates to a calibration method, a calibration system, and a program.

BACKGROUND

As a method for performing a calibration of relative positional orientations between a coordinate system of a robot and a coordinate system of an image sensor, a method is conventionally known in which an image of a flat plate (calibration object) with dots and a polygonal mark marker printed thereon is captured by an image sensor, and calibration computation is performed based on the captured image.

For example, Patent Document 1 describes a calibration method that aims to reduce calibration errors for an articulated robot that has hysteresis characteristics in its operation. Specifically, in this method, a coordinate system of a robot and a coordinate system of an image sensor are calibrated using a calibration object. An image is captured at a first measurement point using an image capture device, and when the orientation of the robot is changed to reach a second measurement point at which the robot assumes a different orientation, the robot is caused to reach the second measurement point via a predetermined specific point.

JP 2015-182144 is an example of background art.

When a calibration of a positional relationship between a coordinate system of a robot and a coordinate system of an image capture device is performed using a calibration object, computation for the calibration is performed based on a captured image of the calibration object acquired at respective measurement points by the image capture device. Accordingly, it is favorable that the mode of calibration object is appropriately selected in accordance with measurement conditions.

However, the calibration method disclosed in Patent Document 1 uses a single calibration object (print) with a plurality of dots and a mark marker that are predetermined printed thereon. For this reason, there are cases where the calibration accuracy cannot be ensured depending on the captured image. To ensure the calibration accuracy, prints of calibration objects with a plurality of patterns printed thereon need to be prepared, and thus the number of man-hours of calibration increases.

One or more aspects may provide a calibration method and system, and a program that enable a calibration of a relative positional relationship between an image capture device and a robot arm without preparing calibration objects with a plurality of patterns printed thereon.

SUMMARY

A calibration method according to an aspect is a method for calibrating a coordinate system of an image capture device and a coordinate system of a robot arm in a robot system that includes a display device, the image capture device, and the robot arm to which one of the display device and the image capture device is fixed, the robot arm having a drive shaft. This calibration method includes a step of causing the display device to display a first image based on first image data; a step of capturing an image of the first image displayed on the display device and acquiring first captured image data, using the image capture device; a step of causing the display device to display a second image based on second image data different from the first image data; a step of capturing an image of the second image displayed on the display device and acquiring second captured image data, using the image capture device; and a step of calibrating the coordinate system of the image capture device and the coordinate system of the robot arm using the first captured image data and the second captured image data.

According to an aspect, a calibration of a relative positional relationship between the image capture device and the robot arm can be executed without preparing calibration objects with a plurality of patterns printed thereon. Since a calibration can be performed using a plurality of captured images in different forms of display, the calibration accuracy can be improved.

In an aspect, data indicating a pattern in an image to be displayed or data indicating a brightness of the image to be displayed may differ between the first image data and the second image data.

According to an aspect, an image pattern with a brightness appropriate for calibration can be displayed in accordance with the brightness of the surroundings or the like. For example, there are cases where brightness conditions differ between measurement points for measuring the image using the image capture device, in accordance with an angle, illuminance, or the like of lighting, and cases where brightness conditions vary even at the same measurement point. Accordingly, according to an aspect, an appropriate image pattern can be displayed in accordance with different brightness conditions, and thus the calibration accuracy can be improved.

Furthermore, according to an aspect, the pattern in the image to be displayed can be differentiated, and thus the calibration accuracy can be improved. That is to say, since a calibration can be performed using a plurality of captured images of different patterns, the calibration accuracy can be improved. In addition, since the pattern can be differentiated in accordance with an environment in which an image is to be captured, the calibration accuracy can be improved.

In an aspect, each of the first image data and the second image data may be data indicating a pattern in an image to be displayed, and data regarding a color of at least one pixel in the image to be displayed on the display device may differ between the first image data and the second image data.

According to an aspect, the information regarding the captured image data can be increased, and the calibration accuracy can be improved.

In an aspect, the calibration method may further include a step of changing relative positions of the display device and the image capture device using the robot arm, after acquiring the first captured image data, and the step of acquiring the second captured image data may be performed after the step of changing the relative positions.

According to an aspect, images that are displayed based on different image data are captured with different relative positions, and the captured image data is acquired. Thus, the calibration accuracy can be improved. For example, a configuration is employed in which different captured image data is acquired to perform calibration computation before and after the robot arm is operated to a measurement point at which the relative positions of the display device and the image capture device differ. Thus, an image appropriate for measurement conditions, such as a relative positional relationship between the display device and the image capture device, can be selected, and the calibration accuracy can be improved.

In an aspect, during the step of causing the display device to display the first image and the step of causing the display device to display the second image, in the first image data or the second image data, a size of a pattern in the first image or the second image to be displayed may be changed in accordance with coordinates of a leading end of the robot arm.

According to an aspect, the image data is changed so as to differentiate the size of the image pattern in accordance with the coordinates of the leading end of the robot arm, and thus, an image pattern with a size appropriate for calibration can be displayed in accordance with a relative positional relationship between the display device and the image capture device. A calibration of a coordinate system of an image capture device and a coordinate system of a robot arm is performed to improve the accuracy of predetermined processing for an object using a robot arm (e.g. gripping, suction, fitting, winding etc. of the object). Accordingly, the calibration accuracy can be improved by changing the image data so as to differentiate the size of the image pattern in accordance with the coordinates of the leading end of the robot arm that acts on an object, and performing a calibration using a plurality of types of captured images that are based on different image patterns.

In an aspect, during the step of causing the display device to display the first image and the step of causing the display device to display the second image, in the first image data or the second image data, a size of a pattern in the first image or the second image to be displayed may be changed in accordance with a distance between the image capture device and the display device.

According to an aspect, an image pattern with a size appropriate for calibration can be displayed in accordance with the relative distance between the display device and the image capture device. The accuracy of a calibration of a coordinate system of an image capture device and a coordinate system of a robot arm based on a captured image depends on the degree of accuracy to which the image capture device can identify the size of the image pattern. Here, for example, an image pattern included in a captured image is smaller when the distance from the image capture device to the display device is longer than when the distance is shorter. For this reason, it is favorable that an image pattern with an appropriate size is selected in accordance with the distance from the image capture device to the display device. Accordingly, according to an aspect, an image is displayed based on an image pattern that can be accurately identified by the image capture device, in accordance with the relative distance between the image capture device and the display device, and thus the calibration accuracy can be improved.

In an aspect, the step of changing the relative positions of the display device and the image capture device may include a step of changing a relative angle between the display device and the image capture device, and at least data indicating a brightness of an image to be displayed may differ between the first image data and the second image data.

According to an aspect, an image pattern with a brightness appropriate for calibration can be displayed in accordance with the brightness or the like that changes in accordance with the relative angle between the display device and the image capture device. For example, when an image pattern is displayed on the display device, there are cases where brightness conditions differ between measurement points between which the angle between the display device and the image capture device differs. In such cases, a situation where the image capture device cannot identify the image displayed on the display device may occur. This situation often occurs when the relative angle between the display device and the lighting is in a predetermined range. However, according to an aspect, brightness conditions for the image data are differentiated before and after the step of changing the relative angle between the display device and the image capture device. Accordingly, an image pattern with an appropriate brightness can be displayed in association with the brightness conditions that differ between measurement points, and it is thus possible to more reliably capture an image of the image displayed on the display device using the image capture device, and improve the calibration accuracy. Note that the step of changing the relative angle between the display device and the image capture device may be performed simultaneously with the step of changing the relative positions of the display device and the image capture device.

In an aspect, a relative positional orientation of the image capture device with respect to the display device during the step of acquiring the first captured image data and a relative positional orientation of the image capture device with respect to the display device during the step of acquiring the second captured image data may be the same.

According to an aspect, the quantity of information regarding the captured image data obtained at the same measurement point can be increased, and thus the calibration accuracy is improved. Specifically, information includes a plurality of values to be substituted for each term in a computing equation for a calibration. By performing computation using the information including a plurality of values, and obtaining, for example, a weighted average for a plurality of calculated transformation matrices (values in the transformation matrices slightly differ from each other due to different patterns), a transformation matrix in which errors have been further reduced can be obtained.

In an aspect, the display device may include a sensor for measuring a brightness, and a computing unit configured to change the first image data or the second image data based on a detection value from the sensor. During the step of causing the display device to display the first image and the step of causing the display device to display the second image, in the first image data or the second image data, a brightness of the first image or the second image to be displayed may be changed in accordance with the detection value from the sensor for measuring the brightness.

According to an aspect, an image pattern with an appropriate brightness can be displayed based on a detection value from the sensor included in the display device. For example, to set an image pattern with an appropriate brightness that differs between measurement points, it is favorable to detect the conditions under which light is applied to a subject whose image is to be captured by the image capture device. Accordingly, according to an aspect, an image pattern with an appropriate brightness is selected based on a detection value from the sensor included in the subject (display device) to which light from the lighting, natural light, or the like is applied. Thus, an image pattern with a brightness appropriate for the brightness conditions that differ between the measurement points can be displayed, and the calibration accuracy can be improved. In an aspect, the display device may include an input unit configured to input information, and a computing unit configured to change the first image data or the second image data based on the input information. During the step of causing the display device to display the first image and the step of causing the display device to display the second image, in the first image data or the second image data, a size and a brightness of a pattern in the first image or the second image to be displayed may be changed in accordance with the input information.

According to an aspect, an image pattern with a size and brightness appropriate for calibration can be displayed based on the information input from the input unit included in the display device. That is to say, the image pattern is appropriately changed based on the information that is input, in advance, to the input unit in the display device, or the information that is input every time an image is captured. Accordingly, it is possible to readily realize image pattern selection, and improve the calibration accuracy while reducing the number of man-hours of operation.

In an aspect, the display device and the robot arm may be fixed to each other. The display device may include a sensor for measuring an amount of movement. In the first image data or the second image data, a size of a pattern in the first image or the second image to be displayed may be determined based on the amount of movement measured by the sensor.

According to an aspect, an image pattern with a size appropriate for calibration can be displayed using the sensor included in the display device. That is to say, since the display device can change the image pattern to display in accordance with the amount by which the display device moves, a simple configuration allows the image pattern to be changed, and the calibration accuracy can be improved while reducing the number of man-hours of operation.

In an aspect, the display device and the robot arm may be fixed to each other. The display device may include a sensor for measuring an inclination. Data indicating a brightness of an image to be displayed based on at least one of the first image data and the second image data may be determined based on a value of the inclination measured by the sensor. According to an aspect, an image pattern with a size appropriate for calibration can be displayed using the sensor included in the display device. That is to say, since the display device can change the image pattern to display in accordance with the inclination thereof, a simple configuration allows the image pattern to be changed, and the calibration accuracy can be improved while reducing the number of man-hours of operation.

A calibration method according to an aspect is a method for calibrating a coordinate system of an image capture device and a coordinate system of a robot arm in a robot system that includes a display device, the image capture device, and the robot arm to which one of the display device and the image capture device is fixed, the robot arm having a drive shaft. The method includes: a step of causing the display device to display a first image based on first image data; a step of capturing an image of the first image displayed on the display device and acquiring first captured image data, using the image capture device; and a step of calibrating a relative positional relationship between the image capture device and the robot arm, using the first captured image data.

According to an aspect, a calibration of a relative positional relationship between the image capture device and the robot arm can be performed without preparing calibration objects with a plurality of patterns printed thereon.

In an aspect, in the first image data, data indicating a pattern in an image to be displayed or data indicating a brightness of the image to be displayed may be determined in accordance with an image-capturing environment.

According to an aspect, a calibration can be performed using an appropriate image pattern in accordance with an image-capturing environment at the measurement point, and thus the calibration accuracy can be improved.

A program according to an aspect is a program for performing a method for calibrating a coordinate system of an image capture device and a coordinate system of a robot arm in a robot system that includes a display device, the image capture device, and the robot arm to which one of the display device and the image capture device is fixed, the robot arm having a drive shaft, the program for causing a computer to perform: a step of causing the display device to display a first image based on first image data; a step of causing the image capture device to capture an image of the first image displayed on the display device to acquire first captured image data; a step of causing the display device to display a second image based on second image data different from the first image data; a step of causing the image capture device to capture an image of the second image displayed on the display device to acquire second captured image data; and a step of calibrating the coordinate system of the image capture device and the coordinate system of the robot arm using the first captured image data and the second captured image data.

According to an aspect, a program can be provided that is for causing a computer to perform a calibration of a relative positional relationship between the image capture device and the robot arm, without preparing calibration objects with a plurality of patterns printed thereon. Since a calibration can be performed using a plurality of captured images in different forms of display, the calibration accuracy can be improved.

In an aspect, data indicating a pattern in an image to be displayed or data indicating a brightness of the image to be displayed may differ between the first image data and the second image data.

According to an aspect, an image pattern with a brightness appropriate for calibration can be displayed in accordance with the brightness of the surroundings or the like. For example, there are cases where brightness conditions differ between measurement points for measuring the image using the image capture device, in accordance with an angle, illuminance, or the like of the lighting, and cases where brightness conditions vary even at the same measurement point. Accordingly, according to an aspect, an appropriate image pattern can be displayed in accordance with different brightness conditions, and thus the calibration accuracy can be improved.

Furthermore, according to an aspect, the pattern in the image to be displayed can be differentiated, and thus the calibration accuracy can be improved. That is to say, since a calibration can be performed using a plurality of captured images of different patterns, the calibration accuracy can be improved. In addition, since the pattern can be differentiated in accordance with an environment in which an image is to be captured, the calibration accuracy can be improved.

In an aspect, each of the first image data and the second image data may be data indicating a pattern in an image to be displayed, and data regarding a color of at least one pixel in the image to be displayed on the display device may differ between the first image data and the second image data.

According to an aspect, the information of the captured image data can be increased, and the calibration accuracy can be improved.

A calibration system according to an aspect includes: a display device configured to display a first image based on first image data, and display a second image based on second image data different from the first image data; an image capture device configured to capture an image of each of the first image and the second image, and acquire first captured image data and second captured image data; a robot arm to which one of the display device and the image capture device is fixed, the robot arm having a drive shaft; and a computing unit configured to perform computation to calibrate a coordinate system of the image capture device and a coordinate system of the robot arm, using the first captured image data and the second captured image data.

According to an aspect, a calibration of a relative positional relationship between the image capture device and the robot arm can be performed without preparing calibration objects with a plurality of patterns printed thereon. Since a calibration can be performed using a plurality of captured images in different forms of display, the calibration accuracy can be improved.

In an aspect, data indicating a pattern in an image to be displayed or data indicating a brightness of the image to be displayed may differ between the first image data and the second image data.

According to an aspect, an image pattern with a brightness appropriate for calibration can be displayed in accordance with the brightness of the surroundings or the like. For example, there are cases where brightness conditions differ between measurement points for measuring the image using the image capture device, in accordance with an angle, illuminance, or the like of the lighting, and cases where brightness conditions vary even at the same measurement point. Accordingly, according to an aspect, an appropriate image pattern can be displayed in accordance with different brightness conditions, and thus the calibration accuracy can be improved.

Furthermore, according to an aspect, the pattern in the image to be displayed can be differentiated, and thus the calibration accuracy can be improved. That is to say, since a calibration can be performed using a plurality of captured images of different patterns, the calibration accuracy can be improved. In addition, since the pattern can be differentiated in accordance with an environment in which an image is to be captured, the calibration accuracy can be improved.

In an aspect, each of the first image data and the second image data may be data indicating a pattern in an image to be displayed, and data regarding a color of at least one pixel in the image to be displayed on the display device may differ between the first image data and the second image data According to an aspect, the information of the captured image data can be increased, and the calibration accuracy can be improved.

One or more aspects can provide a calibration method and system, and a program that enable a calibration of a relative positional relationship between an image capture device and a robot arm, without preparing calibration objects with a plurality of patterns printed thereon.

DETAILED DESCRIPTION

Figure 1:
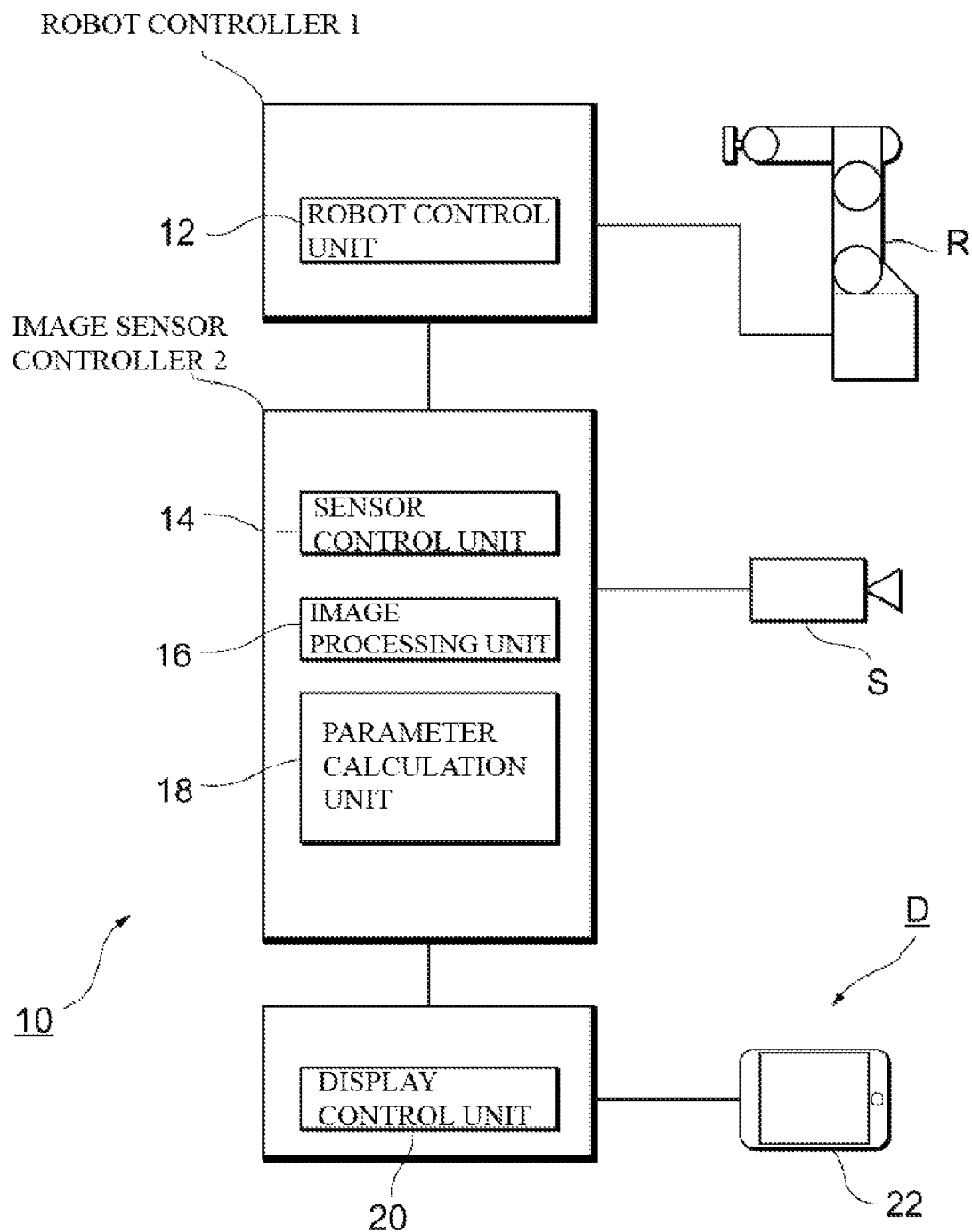
FIG. 1 is a functional block diagram illustrating a calibration system.

Hereinafter, embodiments will be described with reference to the attached drawings (note that, in the diagrams, portions assigned the same reference signs have the same or similar configurations). The calibration method that will be described below in the embodiments is for calibrating a coordinate system of an image capture device and a coordinate system of a robot arm in a robot system that includes a display device, the image capture device, and the robot arm to which one of the display device and the image capture device is fixed. A calibration pattern that is based on image data is displayed on the display device.

In the calibration method described in any of the following embodiments, the display device has a display for displaying a plurality of image patterns in which at least one of the calibration pattern and the brightness of the image when the calibration pattern is displayed differs.

In the calibration method described in any of the following embodiments, the display device is configured to change the image pattern and change the form of display for the image to be displayed on the display, in accordance with an image-capturing environment. "Image-capturing environment" refers to an environment that is due to a configuration of the robot system, and includes, for example, a relative distance between the image capture device and the display and relative orientations thereof, which serve as relationships between the display and the image capture device. Also, "image-capturing environment" refers to an environment around the robot system, and is, for example, the brightness of the surroundings when the image capture device captures an image of an image pattern displayed on the display. With this configuration, the calibration can be performed using an appropriate image pattern in accordance with a change in the image-capturing environment, and accordingly, the calibration accuracy can be improved.

In the calibration method described in any of the following embodiments, the display device may determine the image pattern to be displayed on the display at a measurement point at which the image capture device captures an image of the display, in accordance with the image-capturing environment. With this configuration, the calibration can be performed using an appropriate image pattern in accordance with the image-capturing environment at the measurement point, and accordingly, the calibration accuracy can be improved.

In the calibration method described in any of the following embodiments, the display device is configured to change the image pattern to be displayed on the display at a measurement point at which the image capture device captures an image of the display, and displays a plurality of images in different forms of display, on the display. With this configuration, the quantity of information regarding the image data acquired at a measurement point can be increased, and thus the calibration accuracy can be improved.

First Embodiment

FIG. 1 is a functional block diagram of a calibration system 10 according to a first embodiment. This calibration system 10 has a robot R, and a robot controller 1 that has a robot control unit 12 for controlling the robot R. The calibration system 10 also includes an image sensor S, which serves as an image capture device. The robot controller 1 is configured to control operations of the robot R based on images captured by the image sensor S. In an embodiment, the system that includes the robot R, the robot controller 1, and the image sensor S is called a robot system. The calibration system 10 includes an image sensor controller 2 that has a sensor control unit 14 for controlling the image sensor S, an image processing unit 16 for processing images captured by the image sensor S, and a parameter calculation unit 18 (computing unit) for calculating parameters of a calibration between the robot R and the image sensor S. The calibration system 10 also includes a display device D that has a display 22 and a display control unit 20 for displaying images on this display 22. The control units, processing unit, and calculation unit are realized by a later-described hardware processor executing predetermined programs. The control units, processing unit, and calculation unit can exchange data with each other via wired or wireless communication.

The robot R is a multi-axis articulated robot arm R, which includes a base fixed to a floor surface, a plurality of joints that function as movable shafts, and a plurality of links that rotate together with the joints. The links are movably connected to each other via corresponding joints. A link at a leading end of the robot arm R can be connected to an end effector E. In an embodiment, the robot arm R is a vertical articulated robot that has six degrees of freedom and in which the base and the plurality of links are connected in series via the joints.

The robot control unit 12 is arranged in a robot controller that has a storage device that stores a control program for controlling the robot R, and a processor for outputting a control signal for driving a servomotor provided in each joint of the robot R to rotate the servomotor in accordance with this control program.

The image sensor S is an image capture device for capturing an image to acquire captured image data, and is constituted by a CCD camera, for example.

The sensor control unit 14 outputs a control signal for controlling the image sensor S. The image processing unit 16 performs image processing on the captured image data acquired by the image sensor S, and outputs the image-processed captured image data to the parameter calculation unit 18. The sensor control unit 14 has a storage device that stores a program for computing and outputting a control signal for controlling the image sensor S, and a processor for performing computing processing in accordance with the program. The image processing unit 16 has a storage device that stores a program for performing image processing on the captured image data and outputting the processing results to the parameter calculation unit 18, and a processor for performing computing processing in accordance with the program. Note that the sensor control unit 14 and the image processing unit 16 may be configured integrally and have a shared storage device and processor. The sensor control unit 14 and the image processing unit 16 may be configured integrally with the later-described parameter calculation unit 18 and have a shared storage device and processor.

The parameter calculation unit 18 is constituted by a computer program for performing the calibration method according to an embodiment, a storage device that stores this computer program, data being processed, later-described image data, and so on, and a processor that performs various kinds of computing processing in accordance with the computer program.

A processor that is used in common for computing processing of each of the robot control unit 12, the sensor control unit 14, the image processing unit 16, the parameter calculation unit 18, and the later-described display control unit 20, or computing processing of at least two units selected from thereamong may be a CPU (Central Processing Unit), a GPU (Graphic Processing Unit), an FPGA (Field Programmable Gate Array), a DSP (Digital Signal Processor), and an ASIC (Application Specific Integrated Circuit), together with a CPU or solely. A storage device that is used in common for computing processing of each of the robot control unit 12, the sensor control unit 14, the image processing unit 16, the parameter calculation unit 18, and the later-described display control unit 20, or computing processing of at least two units selected from thereamong has a nonvolatile storage device such as an HDD or an SSD, and a volatile storage device such as a DRAM or an SRAM.

In an embodiment, the parameter calculation unit 18 is provided in the image sensor controller 2 (on the image sensor S side), and computing processing required for the calibration method according to an embodiment is performed by the processor provided in the parameter calculation unit 18. By thus using a processor other than the processor in the robot control unit 12, the load of the computing processing required for command processing for controlling the robot R and calculation of calibration parameters can be distributed.

In another embodiment, at least some of the robot control unit 12, the image processing unit 16, and the parameter calculation unit 18 may be realized by using shared hardware. For example, a calibration may be performed using the processor in the robot controller, or the control program for controlling the robot R and the program for performing a calibration may be stored in a shared storage device. In this regard, at least two of the robot controller 1, the image sensor controller 2, and the display device D may be configured integrally and share the storage device for storing the programs and the processor for performing computing processing.

The display control unit 20 generates image data for displaying various calibration patterns on the display 22, and outputs the generated image data to the display 22. The display 22 is constituted by, for example, a liquid-crystal display and so on, and displays an image based on the image data received from the display control unit 20. For example, a commercially-available tablet, smartphone, or the like can be used as hardware of the display device D constituted by the display control unit 20 and the display 22, but the display device D is not limited thereto and may alternatively be any other kind of liquid-crystal display device or organic EL display device. In an embodiment, the display control unit 20 and the display 22 are integrally expressed as the display device D. However, the display control unit 20 and the display 22 may be separately provided, rather than being integrated to serve as the display device D. In this case, the display 22 may include a storage device that stores a computer program for performing display processing or the like, data being processed, and so on, and a processor that performs various kinds of computing processing in accordance with the computer program.

Note that, in an embodiment, the image data is stored in the storage device provided in the display control unit 20. The image data includes information regarding an image pattern that forms an image to be displayed on the display device D. The image pattern includes a calibration pattern, which is a pattern of an image to be displayed on the display device D, and information for determining the brightness of the image to be displayed on the display device D. The mode of the calibration pattern will be described later.

Figure 2:
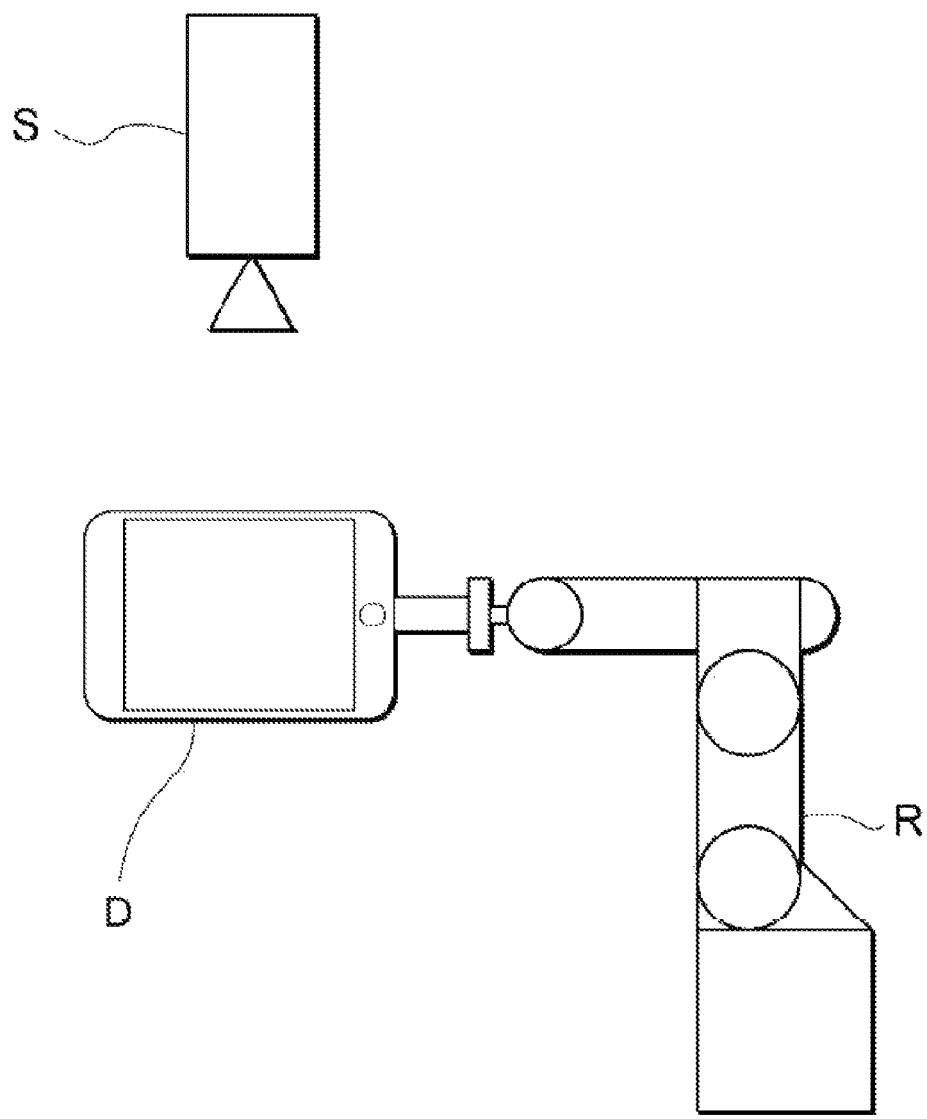
FIG. 2 is a schematic diagram illustrating a calibration method in a case where a display 22 and a robot are fixed to each other.

FIG. 2 is a schematic diagram illustrating an example of performing a calibration with the display device D (display 22) fixed to the robot R. An image pattern can be displayed with various relative angles and relative positions of the display device D with respect to the image capture device S by moving the robot arm of the robot R while gripping the display device D. The display device D is gripped and fixed by the end effector E connected at the leading end of the robot R. Meanwhile, the image capture device S is fixed to a ceiling of a factory or the like, for example. Note that the method of fixing the display device D to the robot R is not limited to gripping using the end effector E. For example, the display device D may be fixed to the link at the leading end of the robot arm R via a connection structure such as a fixing jig. Alternatively, the display device D may be fixed to a link that constitutes the robot arm R via a predetermined connection structure. In the case of fixing the display device D to a link that constitutes the robot arm R, it is favorable that the display device D is fixed to the distal-most link of the robot arm R.

Figure 3:
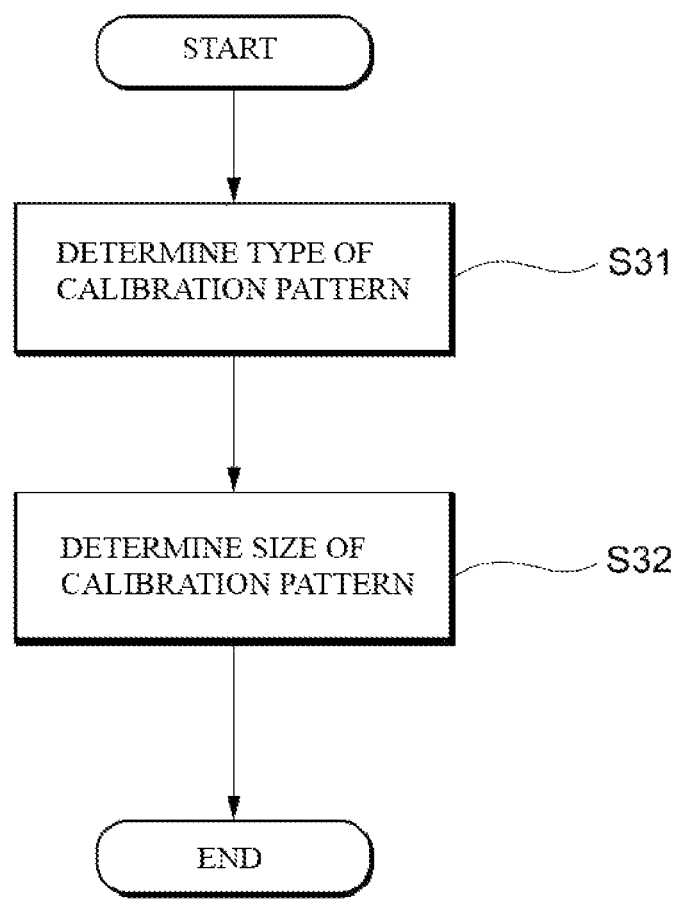
FIG. 3 is a diagram illustrating an initial setting procedure for a display device.
Figure 4A:
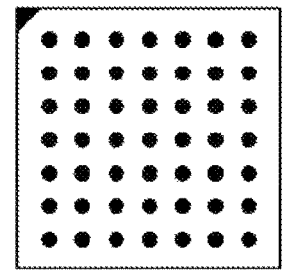
FIGS. 4A to 4D are diagrams illustrating examples of calibration objects.
Figure 4B:
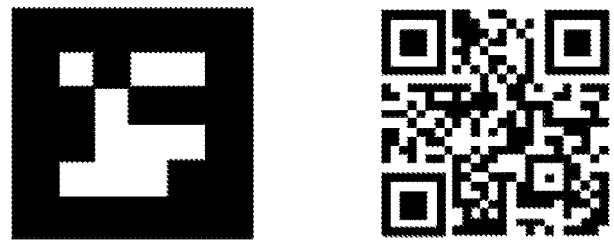
Figure 4C:
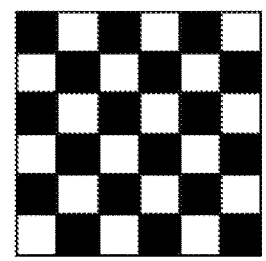
Figure 4D:
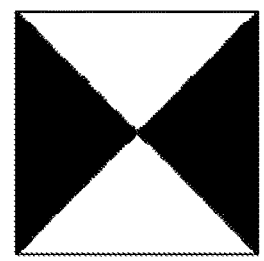

FIG. 3 shows an example of an initial setting procedure for the display device D. Initially, the type of calibration pattern to be displayed on the display 22 is determined (S31). FIGS. 4A to 4D show examples of calibration patterns. FIG. 4A shows a dot image pattern constituted by a square frame line and a total of 49 (7 rows by 7 columns) black dots that are arranged at regular intervals in this frame line. Meanwhile, one of the corners is painted in a triangular shape to specify the direction of the square. That is to say, the calibration pattern shown in FIG. 4A is a pattern that includes black dots arranged at predetermined intervals in the frame line, and a polygonal mark marker for specifying the direction of the pattern. FIG. 4B shows image patterns of an AR marker (left) and a two-dimensional barcode (right). FIG. 4C shows an example of a checkerboard pattern (an image pattern in which black squares and white squares are arranged alternately), and FIG. 4D shows an example of an image pattern constituted by triangles. Various image patterns can be used in accordance with the positional relationship between the robot R and the image sensor S, the purpose of calibration, required accuracy, or the like. For example, the number and size of black dots in the aforementioned dot pattern can be set arbitrarily. In an embodiment, the dot image pattern is selected. The display control unit 20 is configured to output image data for displaying the selected image pattern to the display 22.

Note that constituent elements of the calibration pattern included in each image pattern are pixels, and a pixel is the minimum unit of information regarding a color to be displayed on the display 22. If black and white of at least one pixel are reversed, image patterns are dealt with as different ones. For this reason, two image patterns that have similar shapes but have different sizes are different image patterns.

Next, the size of the calibration pattern is determined (S32). In an embodiment, the size of the pattern is determined based on the relative distance between the display 22 and the image sensor S that is calculated as follows.

First, the image sensor S is fixed to a ceiling or the like of a factory in which the robot R is installed. Accordingly, the position coordinates of the image sensor S are known. Similarly, the origin coordinates (base coordinates), which is obtained with the base of the robot R serving as a reference, are also known. For this reason, the relative positions of these coordinates and the relative distance therebetween are obtained, in advance, with an error of several centimeters by means of an installation design drawing or actual measurement, for example.

Next, the leading end coordinates of the robot arm R are obtained. Specifically, the leading end coordinates are obtained by means of kinetics calculation based on the rotation angle of each movable shaft and length data (shape data) of each link, with the origin coordinates of the robot arm serving as a reference. Initially, the robot control unit 12 acquires information regarding the rotation angle of each movable shaft, and outputs the acquired information to the parameter calculation unit 18. The parameter calculation unit 18 calculates the leading end coordinates based on the received rotation angle information, as well as the length data of each link and the origin coordinates of the robot R that are known.

Next, the coordinates of the display 22 (calibration object) are obtained. Specifically, the coordinates of the display 22 are obtained based on the known shape data (length data) of the display 22, with the leading end coordinates of the robot arm R serving as a reference. If the position and orientation of the display 22 (calibration object) relative to the leading end coordinate system of the robot arm R are changeable, the coordinates of the display 22 are obtained based not only on the shape data of the display 22, but also on a changed position and orientation. Next, the coordinates of the display 22 are obtained with the origin coordinates of the robot arm R serving as a reference, based on the coordinates of the display 22 relative to the leading end coordinate system of the robot arm R.

Then, the relative distance between the display 22 and the image sensor S is calculated based on the calculated coordinates of the display 22 and position coordinates of the image sensor S.

Note that the size of the later-described image pattern may be changed using the relative distance (second relative distance) between the leading end coordinates of the robot arm R and the image sensor S, in place of the relative distance (first relative distance) between the display 22 and the image sensor S. Since the display 22 (calibration object) is smaller than the robot arm R, and the positional orientation of the display 22 varies in accordance with operations of the robot arm R at the leading end coordinates, a change in the distance between the display 22 and the image sensor S can also be addressed even if the second relative distance is used in place of the first relative distance, and furthermore, the amount of computation can be reduced.

The display control unit 20 generates image data in which the size of the image pattern selected in step S31 has been adjusted based on the relative distance calculated by the parameter calculation unit 18, and outputs the generated image data to the display 22. The display 22 displays a predetermined image pattern based on the received image data.

Note that the method of calculating the relative distance between the display 22 and the image sensor S is not limited to the above-described method. For example, the relative distance may be calculated based on a change in the size of the pattern included in the calibration pattern image captured by the image sensor S. For example, an interval (first interval) between a first pattern element and a second pattern element that are predetermined and included in the calibration pattern is obtained in advance, and a relative distance (third relative distance) can be calculated based on information regarding the first interval, information indicating an interval (second interval) between the first pattern element and the second pattern element extracted from a captured image, and sensor parameters of the image sensor S. This configuration makes it possible to calculate the relative distance between the image sensor S and the display 22 based on the size of the calibration pattern in a captured image, the size changing in accordance with the distance between the display 22 and the image sensor S, and to vary the size the image pattern to be displayed, in accordance with the calculated relative distance.

As described above, the size of the later-described image pattern can be varied in accordance with a change in the leading end coordinates of the robot arm by using any of the first relative distance, the second relative distance, and the third relative distance.

Thus, in the calibration method according to an embodiment, the size of the image pattern to be displayed on the display 22 is determined in accordance with the relative distance between the display 22 and the image sensor S. In an embodiment, the size of the image pattern to be displayed (the area of a region enclosed by the square frame line) is predetermined so as to substantially occupy approximately half the image capture region of the image sensor S.

Here, the size of an image pattern means the area of a portion enclosed by an outline of the image pattern, and can be expressed with the number of pixels in the display 22, for example. Note that the size of an image pattern may mean the size (area) of a pattern element that is present within the outline of the image pattern. For example, in the calibration pattern shown in FIG. 4A, the size of the image pattern may indicate the size of each of the black dots that are present within the frame line of the calibration pattern, and the size of the polygonal mark marker. Also, for example, in the calibration patterns shown in FIGS. 4B to 4D, the size of the image pattern may indicate the size of a pattern element that is present within the frame line of each of these calibration patterns. The size of a pattern element that is present within the frame line of each of these image patterns may be changed in accordance with a change in the size of the outline of the image pattern, or may be changed regardless of a change in the size of the outline of the image pattern.

A specific calibration method will be described below using the drawings. In an embodiment, the image pattern displayed as a calibration pattern on the display 22 changes in accordance with various orientations that the robot arm R assumes.

Figure 5:
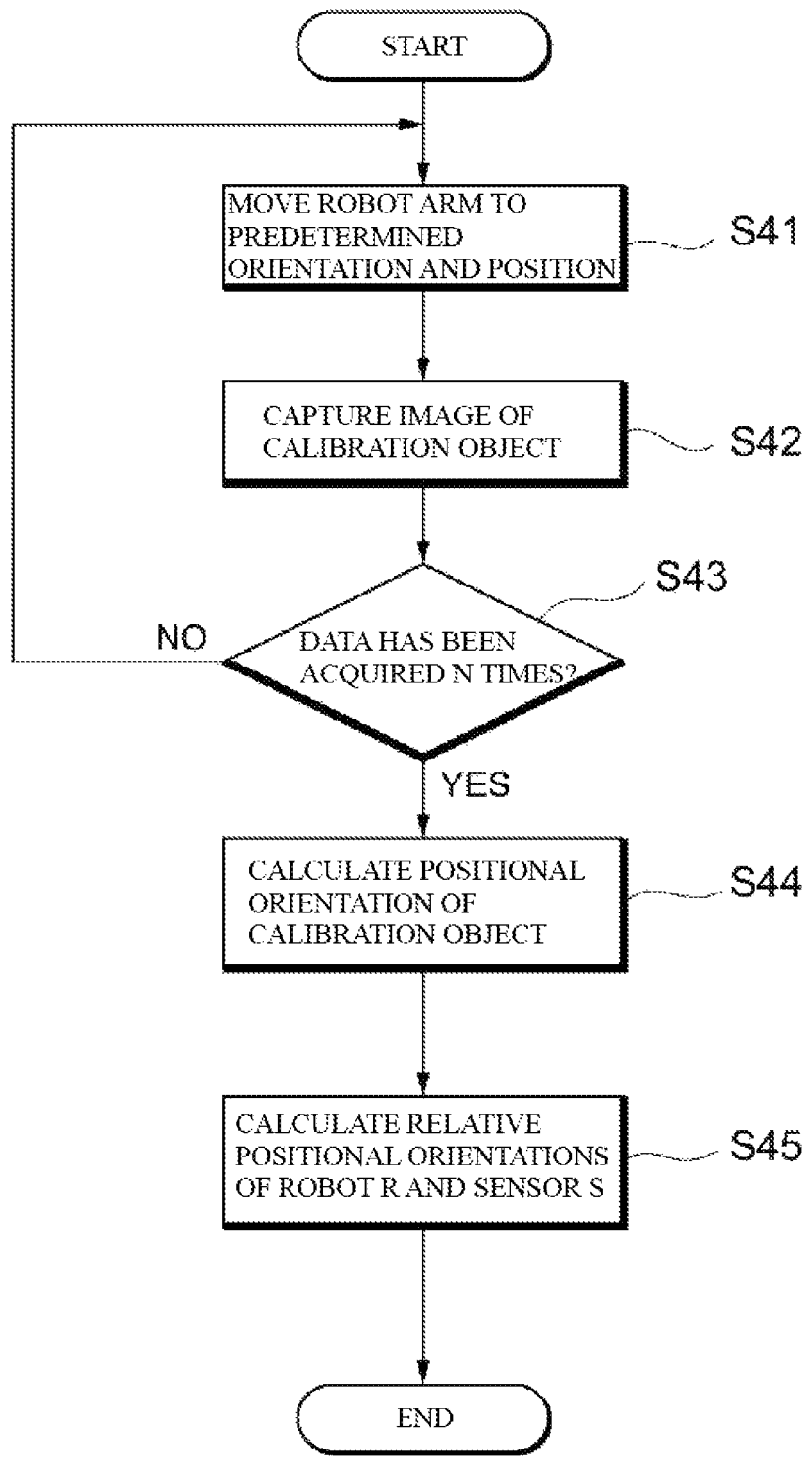
FIG. 5 is a flowchart illustrating a calibration method.

FIG. 5 is a flowchart of the calibration method according to an embodiment.

Initially, the robot arm R assumes a predetermined orientation corresponding to a measurement point at which an image is to be captured, based on a control signal from the robot control unit 12 (S41). At this time, the orientation of the robot arm R is predetermined so that an entire display screen of the display device D is contained in an image capture region that can be captured by the image sensor S.

Next, the relative distance between the leading end coordinates of the robot arm R assuming this orientation (the coordinates of the display 22) and the image sensor S is calculated using the above-described method by the parameter calculation unit 18, and the calculated relative distance is output to the display control unit 20. Subsequently, image data for displaying a dot pattern with a size that is based on the relative distance is generated by the display control unit 20, and is output to the display 22. Simultaneously, the sensor control unit 14 causes the image sensor S to capture an image of the image pattern displayed on the display 22, and acquires the captured image data (S42).

Next, whether or not the number of times that an image is captured has reached a predetermined number of times (N times) is determined by the parameter calculation unit 18 (S43). If not, steps S42 and S43 are repeated. Specifically, processing to move to a measurement point different from the previous measurement point by causing the robot arm R to assume an orientation different from the previous one, processing to calculate the relative distance between the leading end coordinates (the coordinates of the display 22) at this time and the image sensor S, processing to generate image data for displaying a dot pattern with a corresponding size, and processing to cause the image sensor S to capture an image of the image pattern displayed on the display 22 to acquire the captured image data are repeatedly performed.

Here, a smaller image pattern is displayed when the calculated relative distance is short than when the relative distance is long, and a larger image pattern is displayed when the relative distance is long than when the relative distance is short. For example, if the calculated relative distance is 1.2 times greater than that calculated at the previous measurement point, image data is generated so that each side of the square outer frame of the dot pattern and the diameter of each dot in the outer frame are 1.2 times greater than those at the previous time, and is displayed on the display 22. On the other hand, if the calculated relative distance is 0.8 times the relative distance calculated at the previous measurement point, image data is generated so that each side of the outer frame and the diameter of each dot in the outer frame are 0.8 times smaller than those at the previous time, and is displayed on the display 22. This configuration makes it possible to keep the size of the image pattern relative to the image capture region of the image sensor S to a predetermined value or more, and to thus improve the calibration accuracy.

Note that not only dot image patterns with different sizes but also image pattern with different forms may be displayed, and images thereof may be captured. For example, the calibration accuracy can be improved by displaying image patterns in which black and white are reversed and acquiring captured image data for the respective images. That is to say, in at least two image patterns to be displayed, color information regarding at least one of the pixels corresponding to the display device D may be differentiated between a first image pattern and a second image pattern. More specifically, in the first image pattern and the second image pattern, white and black may be reversed in at least one of the pixels corresponding to the display device D. This configuration makes it possible to increase the quantity of acquirable information regarding captured images and improve the calibration accuracy.

The size of the image pattern displayed on the display 22 may be continuously changed while moving the robot arm R to acquire captured image data of the image patterns of the respective sizes. For example, the image pattern displayed on the display 22 may be reduced (or increased) by a fixed size while controlling the robot arm R so that the display 22 approaches (or moves away from) the image sensor S at a fixed speed.

If the number of times that an image is captured has reached the predetermined number of times (N times), and images of N image patterns displayed for N orientations have been captured, the positional orientation of the calibration object (the display 22 on which the calibration pattern is displayed) is calculated based on N sets of captured image data by the parameter calculation unit 18 (S44).

Next, relative positional orientations of the robot and the sensor are obtained by the parameter calculation unit 18 based on the calculated positional orientation of the calibration object, and the positional orientation of the tool (S45). Specifically, a relative positional relationship between the robot and the sensor is acquired based on the following equation.

$$^{cam}H_{cal} = {}^{cam}H_{base} * {}^{base}H_{tool} * {}^{tool}H_{cal}$$

Here, $^{cam}H_{cal}$ in the left-hand side denotes a transformation matrix (including a rotation matrix and a translation vector) that indicates the positional orientation of the calibration object based on the coordinate system of the image capture device (camera), and is calculated based on the captured image data, as in the above-described steps.

$^{base}H_{tool}$ denotes a transformation matrix that indicates the positional orientation of the leading end of the robot arm R that is based on the origin coordinate system thereof, and is calculated, as described above, by means of kinetics calculation based on the rotation angle of each movable shaft constituting the orientation of the robot arm R when the captured image data was acquired, and the known length data of each link.

$^{tool}H_{cal}$ denotes a transformation matrix indicating the positional orientation of the calibration object based on the leading end coordinate system of the robot arm R, and can be acquired, in advance, based on the size of the end effector E and the display device D, for example. If the position and orientation of the calibration object relative to the leading end coordinate system of the robot arm R do not change during at least two times of image capturing, the computation of the transformation matrix expressed as $^{tool}H_{cal}$ can be omitted. The cases where the computation of the transformation matrix expressed as $^{tool}H_{cal}$ can be omitted include, for example, a case where image capturing is performed at least twice under a condition that the calibration object is fixed to the leading end of the robot arm R. In this case, when computation for a calibration is performed using two sets of captured image data acquired in association with each time of image capturing, a condition that the positional orientation of the calibration object relative to the leading end coordinate system of the robot arm R does not change can be used. Accordingly, the computation of the transformation matrix expressed as $^{tool}H_{cal}$ can be omitted.

Accordingly, a transformation matrix $^{cam}H_{base}$ that indicates the positional orientation of the robot R at the origin coordinates seen from the coordinate system of the image sensor S, or an inverse matrix $^{base}H_{cam}$ of this transformation matrix can be acquired as information indicating a relative positional relationship between the robot R and the image sensor S.

Through the above steps, a calibration is complete in which the relative positional relationship between the image sensor S, which is an image capture device, and the robot arm R, which is a robot, is acquired.

Modifications

Modifications of the above-described first embodiment will be described below. Redundant descriptions will be omitted, and different points will be described.

In a first embodiment, the robot arm R and the display device D are fixed to each other, and captured image data required for a calibration is acquired while moving the display device D using the robot arm R. This modification will describe a method in which the robot arm R and the image sensor S are fixed to each other, and captured image data required for a calibration is acquired while moving the image sensor S using the robot arm R.

First, the image sensor S is fixed to the robot arm R. Some commercially-available robot arms R are originally provided with an image sensor S. Such a robot arm R can perform a calibration using the image sensor S thereof. For a robot arm R that is not originally provided with the image sensor S, the image sensor S needs to be fixed to a link at the leading end, for example, using a jig or the like. Meanwhile, the display 22 is fixed at a predetermined position.

Figure 6:
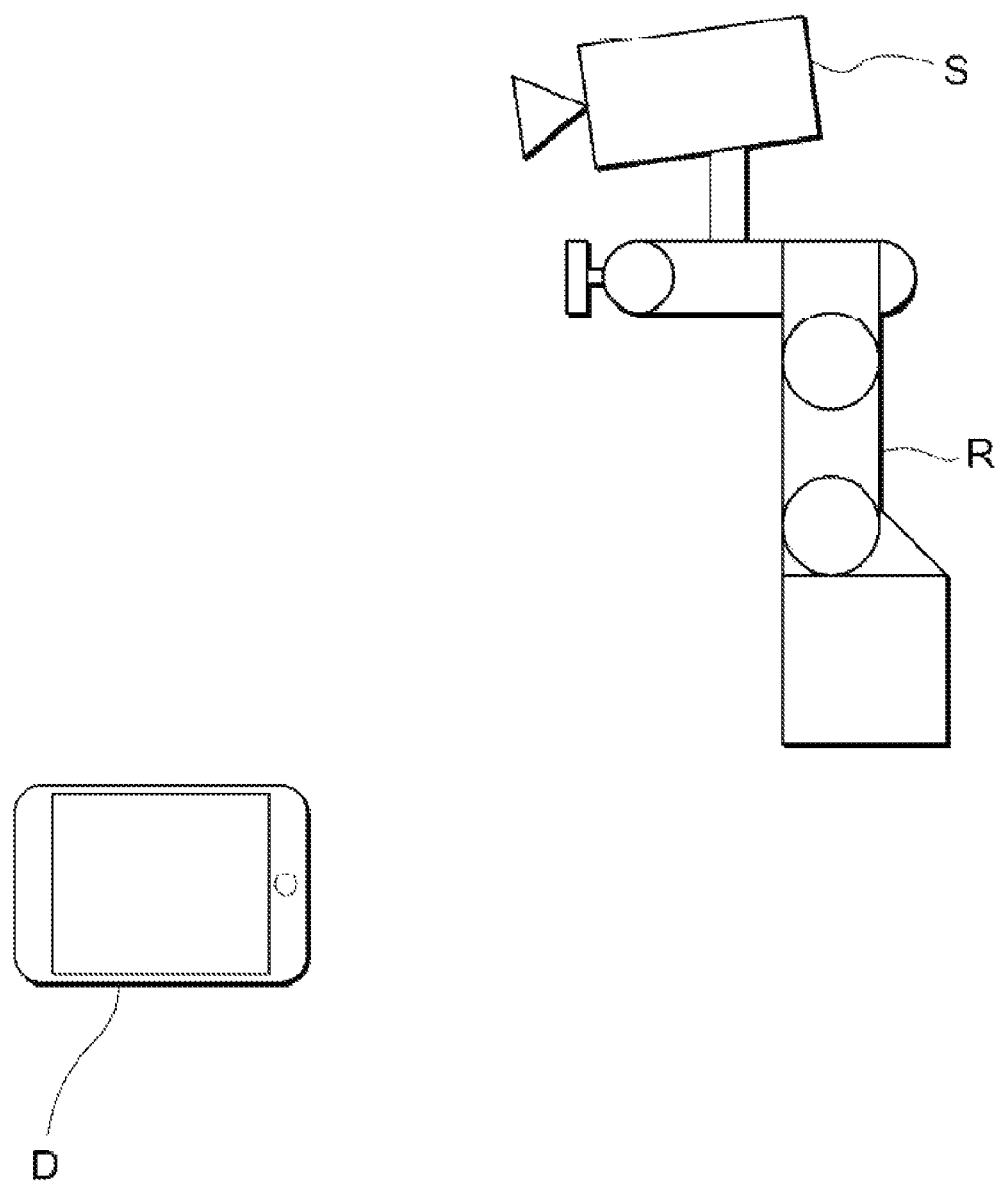
FIG. 6 is a schematic diagram illustrating a calibration method in a case where an image sensor and a robot are fixed to each other.

FIG. 6 is a schematic diagram illustrating a state where an image of an image pattern displayed on the display 22 is captured using the robot arm R with the image sensor S fixed thereto.

A specific calibration method will be described below using the drawings. In this modification as well, the calibration pattern included in the image pattern displayed on the display 22 changes in accordance with various orientations that the robot arm R assumes. The flowchart in FIG. 5 can be used as that of the calibration method according to this modification. The robot arm R assumes a predetermined orientation so that an entire display screen of the display 22 is contained in an image capture region that can be captured by the image sensor S (S41).

Next, the sensor control unit 14 causes the image sensor S to capture an image of the image pattern displayed on the display 22, and acquires captured image data (S42). However, the size of the image pattern can be determined using a method other than that in a first embodiment. For example, the size of the image pattern can be determined based on the relative distance between the leading end coordinates of the robot arm R and the position coordinates of the fixed display 22.

Next, whether or not the number of times that an image is captured has reached a predetermined number of times (N times) is determined by the parameter calculation unit 18 (S43). If not, steps S42 and S43 are repeated. Specifically, the image sensor S captures images of various image patterns displayed on the display 22 to acquire the captured image data while the robot arm R is assuming various orientations.

If the number of times that an image is captured has reached a predetermined number of times (N times), the positional orientation of the calibration object (the display 22 on which the calibration pattern is displayed) is calculated based on the captured image data by the parameter calculation unit 18 (S44).

Then, the relative positional orientations of the robot and the sensor are obtained by the parameter calculation unit 18 based on the calculated positional orientation of the calibration object and the positional orientation of the tool (S45). Specifically, a relative positional relationship between the robot and the sensor is acquired based on the following equation.

$$^{cam}H_{cal} = {}^{cam}H_{tool} * {}^{tool}H_{base} * {}^{base}H_{cal}$$

Here, $^{cam}H_{cal}$ in the left-hand side denotes a transformation matrix (including a rotation matrix and a translation vector) that indicates the positional orientation of the calibration object based on the coordinate system of the camera, and is calculated based on the captured image data, as in the above-described steps.

$^{tool}H_{base}$ denotes an inverse matrix of the transformation matrix that indicates the positional orientation at the leading end that is based on the origin coordinate system of the robot arm R in a first embodiment, and is calculated by means of kinetics calculation based on the rotation angle of each movable shaft constituting the orientation of the robot arm R when the captured image data was acquired, and the known length data of each link.

$^{base}H_{cal}$ a transformation matrix that indicates the positional orientation of the calibration object that is based on the origin coordinate system of the robot arm R, and can be acquired in advance, based on the position coordinates of the display device 22, the size of the display device D, and the like. If the position and orientation of the calibration object relative to the origin coordinate system of the robot arm R do not change during at least two times of image capturing, the computation of the transformation matrix expressed as $^{base}H_{cal}$ can be omitted. The cases where the computation of the transformation matrix expressed as $^{base}H_{cal}$ can be omitted include, for example, a case where the robot arm R is operated, images of the calibration object can be captured using the image sensor S before and after the orientation of the robot arm R is changed, and the location to which the calibration object is fixed does not need to be changed.

Accordingly, a transformation matrix $^{cam}H_{tool}$ that indicates the positional orientation of the robot R at the leading end coordinates seen from the coordinate system of the image sensor S, or an inverse matrix $^{tool}H_{cam}$ of this transformation matrix can be acquired as information indicating a relative positional relationship between the robot R and the image sensor S.

Through the above steps, a calibration is complete in which the relative positional relationship between the image sensor S, which is an image capture device, and the leading end coordinates of the robot arm R is acquired.

As described above, with the calibration method based on an embodiment and the modification thereof, a relative positional relationship between the image sensor S, which is an image capture device, and the robot arm R can be acquired without preparing calibration objects with a plurality of patterns printed thereon.

Note that the size of the square frame of the dot image pattern, the number of dots therein, and the interval between dots can be set arbitrarily. Various image patterns may be combined to be used in a calibration in accordance with the purpose of calibration, or the like.

The calibration system 10 may also include an output unit for outputting a relative positional relationship between the robot R and the image sensor S.

The size of the image pattern may not be determined based on the relative distance between the display 22 and the leading end coordinates of the robot arm R, and may alternatively be determined based on other indexes. For example, the size of the image pattern may be determined in accordance with the distance between a predetermined point and the leading end coordinates of the robot R.

"Leading end coordinates" is intended to include not only the coordinates of the link located at the tip, of the links constituting the robot arm R, but also the coordinates of a point that is located forward of the tip of (i.e. located at a terminal of) the robot arm, such as the leading end or intermediate coordinates of a tool (end effector).

Second Embodiment

A second embodiment will describe points different from a first embodiment, while omitting descriptions of the same features.

In a first embodiment, the size of the image pattern is changed based on the relative distance between the image sensor S and the leading end of the robot arm R. In an embodiment, the size of the calibration pattern (image pattern) is changed based on the amount of blur in the calibration pattern whose image is captured by the image sensor S.

First, a method of estimating the distance based on the amount of blur will be described. If the focal length of an imaging plane lens of the image sensor S is denoted as f, and the distance between the image sensor S and a light source A is denoted as u, the distance v at which the light source A is brought into focus satisfies a relationship expressed as $f^{-1}=u^{-1}+v^{-1}$. Accordingly, if the distance r from the imaging plane lens to the imaging plane satisfies r=v, an in-focus image can be obtained. On the other hand, if r≠v, when the aperture of the image sensor S (camera) is denoted as p, the light source A is projected as a circle having a diameter q=p*|v−r|/v on the imaging plane, and a blur with an amount of blur q occurs.

Accordingly, the amount of blur q can be obtained by preparing, as an image pattern, image data that includes a point, capturing an image of the image pattern, and performing image recognition on captured image data to check the diameter of the point appearing as a circle in the captured image. Then, the distance u between the image sensor S and the calibration object can be estimated based on p, r, and f, which are known, and the above equation.

By changing the size of the image pattern based on the distance u, the size of the calibration pattern to be displayed can be increased even if the image sensor S and the display 22 move away from each other. Also, even if the image sensor S and the display 22 move closer to each other, the entire calibration pattern can be displayed within the image capture region of the image sensor S by reducing the size of the calibration pattern to be displayed.

Furthermore, since computing processing to calculate the leading end coordinates of the robot R and so on can be omitted, the load on the processors can be reduced.

Note that, instead of the distance estimation based on the amount of blur, a configuration may alternatively be employed in which a marker is displayed as an image pattern displayed on the image sensor, and the distance between a plurality of feature points in the marker is calculated by means of image recognition, and the size of the image pattern may be changed based on this distance (or the amount of change in the distance between the feature points according to a change in the orientation).

Third Embodiment (Halation) A third embodiment will describe points different from the above-described embodiments, while omitting the same features.

A calibration system according to an embodiment includes an illuminance sensor. The brightness of the image pattern displayed on the display 22 is differentiated in accordance with the value of the ambient illuminance obtained by the illuminance sensor. It is favorable that the illuminance sensor is integrally provided with the display 22. Specifically, in the case of high illuminance (e.g. in the case where a display surface of the display 22 opposes lighting on the ceiling, and thus the light reflected off the display surface is received by the image sensor 5), the display 22 is caused to display an image pattern based on image data with which the image pattern is relatively darkly displayed compared with the case of low illuminance. In the case of low illuminance (e.g. in the case where the display surface of the display 22 faces toward a floor, and thus the lighting on the ceiling is hardly received by the image sensor 5), the display 22 is caused to display an image pattern based on image data with which the image pattern is relatively brightly displayed compared with the case of high illuminance. It is thereby possible to perform a calibration while reducing the influence of a halation (a phenomenon in which the periphery of a subject is blurred whitely and unclear due to an excessively strong light beam) that is caused due to, for example, the lighting installed on the ceiling.

For example, degradation of the calibration accuracy due to a halation can be suppressed without changing the relative distance between the image sensor S and the display 22, by controlling the robot arm R so as to change the relative angle of the display 22 with respect to the image sensor S and changing the brightness of the displayed image in accordance with the output of an illuminometer.

If, for example, the position of the lighting is known, a configuration may be employed in which image data that indicates the brightness is adjusted based on the positional orientation of the robot arm R, an estimated angle of the display surface of the display 22 relative to the floor surface, or the like.

If a tablet-type mobile information processing terminal or a smartphone is used as the display device D, an illuminance sensor that is originally provided in this terminal may be used.

In an embodiment, "image data" is intended to include not only the shape of a displayed image but also an item whose brightness is to be differentiated, and includes not only data indicating a brightness that is designated for each pixel, but also data indicating control data that defines the output of a backlight of the display 22, and the degree of brightness.

Fourth Embodiment (Use of functions of display device, input unit, sensor etc.) A fourth embodiment will describe points different from the above-described embodiments, while omitting the same features.

In the above-described embodiments, the processors are used to calculate the relative distance between the image sensor S and the leading end of the robot arm R, and so on. However, by providing the display device D with various functions, the display device D can alternatively be used in complicated computing processing to be performed using processors or the like.

Figure 7:
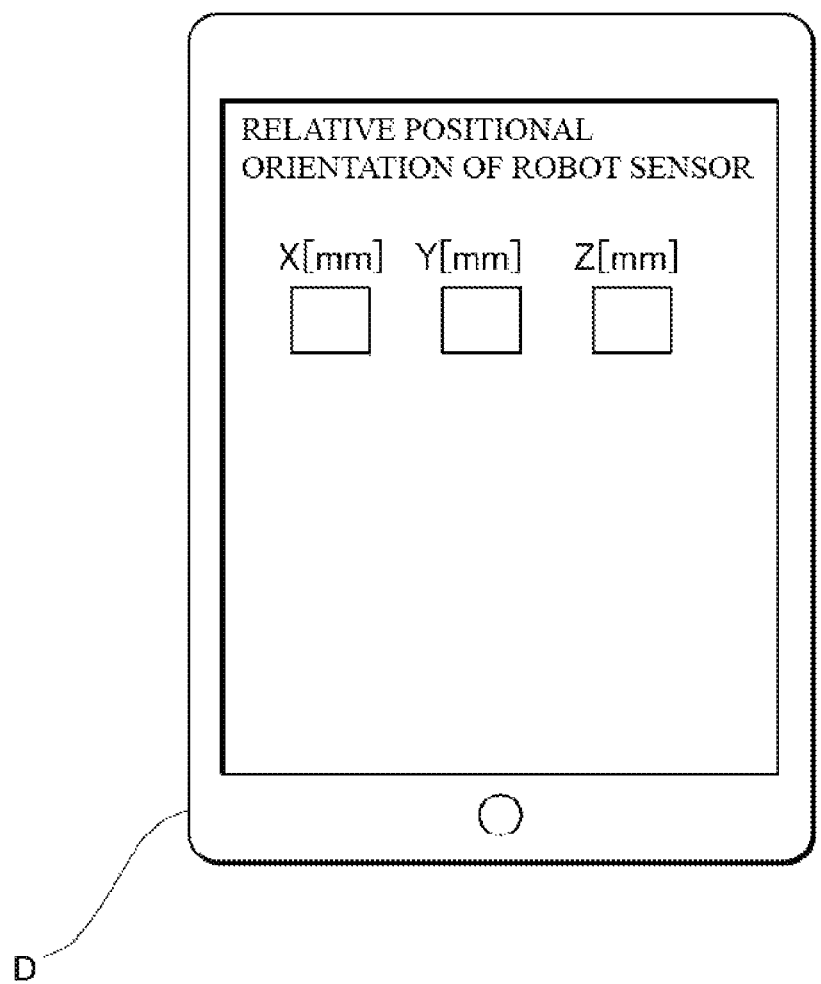
FIG. 7 is a diagram illustrating a screen for inputting relative positional orientations of an image sensor and a robot.

For example, as shown in FIG. 7, a configuration can be employed in which an input I/F (input means) is provided in the display device D, and the input of estimated values of relative positional orientations of the robot R and the image sensor S, and a measurement range and visual field range of the image sensor S (or the input of a model number or the like of the image sensor S that defines these values) are received. In this configuration, an image pattern with an appropriate size, shape, and brightness can be automatically displayed in accordance with the input values. A configuration may also be employed in which the shapes of a plurality of calibration objects are selectably displayed in a scrollable manner on the display 22. Note that the mode of the input I/F is not particularly limited to the mode shown in FIG. 7. For example, information that determines the content of an image pattern may be input via a communication I/F that is provided in the display device D for wired or wireless electrical communication with an external device.

A configuration may also be employed in which an acceleration sensor, a speed sensor, or a tilt (gyroscope) sensor is provided in the display device D or the robot arm R, and an image pattern with an appropriate size, shape, and brightness is automatically displayed based on measurement data from the sensor indicating the amount by which the robot arm R has moved or the inclination of the robot arm R.

This configuration makes it possible to objectively select an image pattern with an appropriate shape, size, or the like. In addition, a physical configuration or the like for transmission and reception, i.e. for receiving data for calculating the relative distance or the like from the robot arm R is not needed, and image data for displaying an image pattern can be determined only with the display device D. Furthermore, in the case of using a mobile terminal (such as a tablet or a smartphone) as the display device D, an input means and various sensors that are originally provided therein can be used.

Note that all of the embodiments may employ a configuration in which images are displayed based on different image patterns at the same measurement point, and computation for a calibration is performed based on a plurality of captured images acquired at the same measurement point. Here, it is favorable that "different image patterns" are image patterns in which color information regarding at least one pixel corresponding to the display device D differs. It is particularly favorable that "different image patterns" are image patterns in which white and black are reversed in at least one pixel in the display device. This configuration makes it possible to increase the quantity of information regarding the captured images acquired at each measurement point, and improve the calibration accuracy. That is to say, value information on which calibration computation is based can be increased by displaying a plurality of types of image patterns in different modes at the same measurement point. Accordingly, with this configuration, computing processing for a calibration can be performed using a plurality of types of image patterns acquired at the same measurement point, and thus the calibration accuracy can be improved.

The above-described embodiments are for facilitate understanding of the present invention, and is not for interpreting the present invention in a limited manner. The elements provided in the embodiments, the arrangement, material, conditions, shape, size, and the like of those elements are not limited to those described as an example, and may be changed as appropriate. Configurations described in different embodiments may be partially replaced, or may be combined.

Note that, in this specification, "unit", "means", and "procedure" do not simply mean physical configurations, but also include the cases where processing performed by such "unit" and the like is realized by software. Processing to be performed by one "unit" or the like or devices may be performed by two or more physical configurations or devices. Processing to be performed by two or more "units" or the like or devices may be performed by one physical means or device.

The above embodiments may also be described, entirely or partially, as in the following Notes, but are not limited thereto.

(Note 1)

A method for calibrating a coordinate system of an image capture device and a coordinate system of a robot arm in a robot system that includes a display device, the image capture device, and the robot arm to which one of the display device and the image capture device is fixed, the robot arm having a drive shaft, the method including:

a step of causing the display device to display a first image based on first image data;

a step of capturing an image of the first image displayed on the display device and acquiring first captured image data, using the image capture device;

a step of causing the display device to display a second image based on second image data different from the first image data;

a step of capturing an image of the second image displayed on the display device and acquiring second captured image data, using the image capture device; and a step of calibrating the coordinate system of the image capture device and the coordinate system of the robot arm using the first captured image data and the second captured image data.

(Note 2)

A method for calibrating a coordinate system of an image capture device and a coordinate system of a robot arm in a robot system that includes a display device, the image capture device, and the robot arm to which one of the display device and the image capture device is fixed, the robot arm having a drive shaft, the method including:

a step of causing the display device to display a first image based on first image data;

a step of capturing an image of the first image displayed on the display device and acquiring first captured image data, using the image capture device; and a step of calibrating the coordinate system of the image capture device and the coordinate system of the robot arm, using the first captured image data.

(Note 3)

A program for performing a method for calibrating a coordinate system of an image capture device and a coordinate system of a robot arm in a robot system that includes a display device, the image capture device, and the robot arm to which one of the display device and the image capture device is fixed, the robot arm having a drive shaft, the program for causing a computer to perform:

causing the display device to display a first image based on first image data;

causing the image capture device to capture an image of the first image displayed on the display device to acquire first captured image data;

causing the display device to display a second image based on second image data different from the first image data;

causing the image capture device to capture an image of the second image displayed on the display device to acquire second captured image data; and calibrating the coordinate system of the image capture device and the coordinate system of the robot arm using the first captured image data and the second captured image data.

(Note 4)

A calibration system comprising:

a display device configured to display a first image based on first image data, and display a second image based on second image data different from the first image data;

an image capture device configured to capture an image of each of the first image and the second image, and acquire first captured image data and second captured image data;

a robot arm configured to change relative positions of the display device and the image capture device, one of the display device and the image capture device being fixed to the robot arm; and a computing unit configured to perform computation to calibrate a coordinate system of the image capture device and a coordinate system of the robot arm, using the first captured image data and the second captured image data.

The invention claimed is:

1. A method for calibrating a coordinate system of an image capture device and a coordinate system of a robot arm in a robot system that includes a display device, the image capture device, and the robot arm to which one of the display device and the image capture device is fixed, the robot arm comprising a drive shaft, the method comprising:

causing the display device to display a first image based on first image data;

capturing an image of the displayed first image and acquiring first captured image data, using the image capture device;

causing the display device to display a second image based on second image data different from the first image data;

capturing an image of the displayed second image and acquiring second captured image data, using the image capture device; and calibrating the coordinate system of the image capture device and the coordinate system of the robot arm using the first captured image data and the second captured image data.

2. The calibration method according to claim 1, wherein data indicating a pattern in an image to be displayed or data indicating a brightness of the image to be displayed differs between the first image data and the second image data.

3. The calibration method according to claim 1, wherein each of the first image data and the second image data comprise data indicating a pattern in an image to be displayed, and data regarding a color of at least one pixel in the image to be displayed differs between the first image data and the second image data.

4. The calibration method according to claim 1, further comprising:

changing relative positions of the display device and the image capture device using the robot arm, after acquiring the first captured image data, wherein acquiring the second captured image data is performed after changing the relative positions.

5. The calibration method according to claim 1, wherein, while causing the display device to display the first image and causing the display device to display the second image, in the first image data or the second image data, a size of a pattern in the first image or the second image to be displayed is changed in accordance with coordinates of a leading end of the robot arm.

6. The calibration method according to claim 1, wherein, while causing the display device to display the first image and causing the display device to display the second image, in the first image data or the second image data, a size of a pattern in the first image or the second image to be displayed is changed in accordance with a distance between the image capture device and the display device.

7. The calibration method according to claim 1, further comprising:

changing a relative angle between the display device and the image capture device using the robot arm, after acquiring the first captured image data, wherein at least data indicating a brightness of an image to be displayed differs between the first image data and the second image data.

8. The calibration method according to claim 1,
wherein a relative positional orientation of the image capture device with respect to the display device while acquiring the first captured image data and a relative positional orientation of the image capture device with respect to the display device while acquiring the second captured image data are the same.

9. The calibration method according to claim 1, wherein the display device includes a sensor for measuring a brightness, and a processor configured with a program to perform operations comprising operation as a computing unit configured to change the first image data or the second image data based on a detection value from the sensor, and
while causing the display device to display the first image and causing the display device to display the second image, in the first image data or the second image data, a brightness of the first image or the second image to be displayed is changed in accordance with the detection value from the sensor for measuring the brightness.

10. The calibration method according to claim 1, wherein the display device comprises a processor configured with a program to perform operations comprising: operation as an input unit configured to input information; and operation as a computing unit configured to change the first image data or the second image data based on the input information, and
while causing the display device to display the first image and causing the display device to display the second image, in the first image data or the second image data, a size and a brightness of a pattern in the first image or the second image to be displayed are changed in accordance with the input information.

11. The calibration method according to claim 1, wherein the display device and the robot arm are fixed to each other,
the display device includes a sensor for measuring an amount of movement, and
in the first image data or the second image data, a size of a pattern in the first image or the second image to be displayed is determined based on the amount of movement measured by the sensor.

12. The calibration method according to claim 1, wherein the display device and the robot arm are fixed to each other,
the display device includes a sensor for measuring an inclination, and
data indicating a brightness of an image to be displayed based on at least one of the first image data and the second image data is determined based on a value of the inclination measured by the sensor.

13. A method for calibrating a coordinate system of an image capture device and a coordinate system of a robot arm in a robot system that includes a display device, the image capture device, and the robot arm to which one of the display device and the image capture device is fixed, the robot arm comprising a drive shaft, the method comprising:
causing the display device to display a first image based on first image data;
capturing an image of the displayed first image and acquiring first captured image data, using the image capture device;
causing the display device to display a second image based on second image data different from the first image data;
capturing an image of the displayed second image and acquiring second captured image data, using the image capture device; and
calibrating a relative positional relationship between the image capture device and the robot arm, using the first captured image data and the second captured image data.

14. The calibration method according to claim 13,
wherein, in the first image data, data indicating a pattern in an image to be displayed or data indicating a brightness of the image to be displayed is determined in accordance with an image-capturing environment.

15. A non-transitory computer-readable storage recording medium storing a program for performing a method for calibrating a coordinate system of an image capture device and a coordinate system of a robot arm in a robot system that includes a display device, the image capture device, and the robot arm to which one of the display device and the image capture device is fixed, the robot arm comprising a drive shaft,
the program causing a computer to perform operations comprising:
causing the display device to display a first image based on first image data;
causing the image capture device to capture an image of the displayed first image to acquire first captured image data;
causing the display device to display a second image based on second image data different from the first image data;
causing the image capture device to capture an image of the displayed second image to acquire second captured image data; and
calibrating the coordinate system of the image capture device and the coordinate system of the robot arm using the first captured image data and the second captured image data.

16. The non-transitory computer-readable recording medium storing the program according to claim 15,
wherein data indicating a pattern in an image to be displayed or data indicating a brightness of the image to be displayed differs between the first image data and the second image data.

17. The non-transitory computer-readable recording medium storing the program according to claim 15,
wherein each of the first image data and the second image data comprise data indicating a pattern in an image to be displayed, and data regarding a color of at least one pixel in the image to be displayed on the display device differs between the first image data and the second image data.

18. A calibration system comprising:
a display device configured to display a first image based on first image data, and display a second image based on second image data different from the first image data;
an image capture device configured to capture an image of each of the first image and the second image, and acquire first captured image data and second captured image data;
a robot arm to which one of the display device and the image capture device is fixed, the robot arm comprising a drive shaft; and
a processor configured with a program to perform operations comprising operation as a computing unit configured to perform computation to calibrate a coordinate system of the image capture device and a coordinate system of the robot arm, using the first captured image data and the second captured image data.

19. The calibration system according to claim 18, wherein data indicating a pattern in an image to be displayed or data indicating a brightness of the image to be displayed differs between the first image data and the second image data.

20. The calibration system according to claim 18, wherein each of the first image data and the second image data comprises data indicating a pattern in an image to be displayed, and data regarding a color of at least one pixel in the image to be displayed on the display device differs between the first image data and the second image data.

* * * * *